United States Patent [19]
Karweit

[11] Patent Number: 4,797,750
[45] Date of Patent: Jan. 10, 1989

[54] METHOD AND APPARATUS FOR TRANSMITTING/RECORDING COMPUTER-GENERATED DISPLAYS ON AN INFORMATION CHANNEL HAVING ONLY AUDIO BANDWIDTH

[75] Inventor: Michael J. Karweit, Baltimore, Md.

[73] Assignee: John Hopkins University, Baltimore, Md.

[21] Appl. No.: 852,738

[22] Filed: Apr. 16, 1986

[51] Int. Cl.⁴ .......................................... H04N 5/782
[52] U.S. Cl. ................................. 358/335; 364/200; 434/307
[58] Field of Search ................ 358/335, 244; 360/55, 360/35.1; 364/200; 434/307

[56] References Cited

U.S. PATENT DOCUMENTS 4,600,989 7/1986 Schwartz et al. ................. 364/200
4,689,022 8/1987 Peers et al. ........................ 434/307

FOREIGN PATENT DOCUMENTS 3005296 8/1981 Fed. Rep. of Germany .

OTHER PUBLICATIONS

Understanding Telephone Electronics pp, 9-10 to 9-13 Copyright 1983.

*Primary Examiner*—Robert L. Richardson
*Attorney, Agent, or Firm*—Cushman, Darby & Cushman

[57] ABSTRACT

A method and apparatus for transmitting/recording a computer-generated display simultaneously with the transmission of audio and/or video signals. A computer generates a series of codes from which an image may be derived, the resolution of which is not dependent on the recording/transmission medium. These codes are supplied to a first modem through a standard RS 232 communications line. The first modem converts these codes into image-bearing audio tones. The audio tones are input in the left audio channel of a video tape recorder. Simultaneously, aural information is picked up by a microphone an input into the right audio channel of the video tape recorder. Also simultaneously, a video camera provides video signals to the video channel of the video tape recorder. After recording these signals on a video tape, the tape is transported to a second video tape recorder where it is played back. On playback, the audio tone signals from the left audio channel of the video tape recorder are provided to a second modem. The second modem reconverts the audio tone signals into computer codes which are provided to a computer monitor which generates and then displays the image generated by the computer with a resolution dependent only upon the monitor. Also on playback, the audio signals from the right audio channel of the video tape recorder are provided to a speaker. Also on playback the video signals recorded on the video channel of the video tape are played back and provided to a standard television for display.

43 Claims, 3 Drawing Sheets

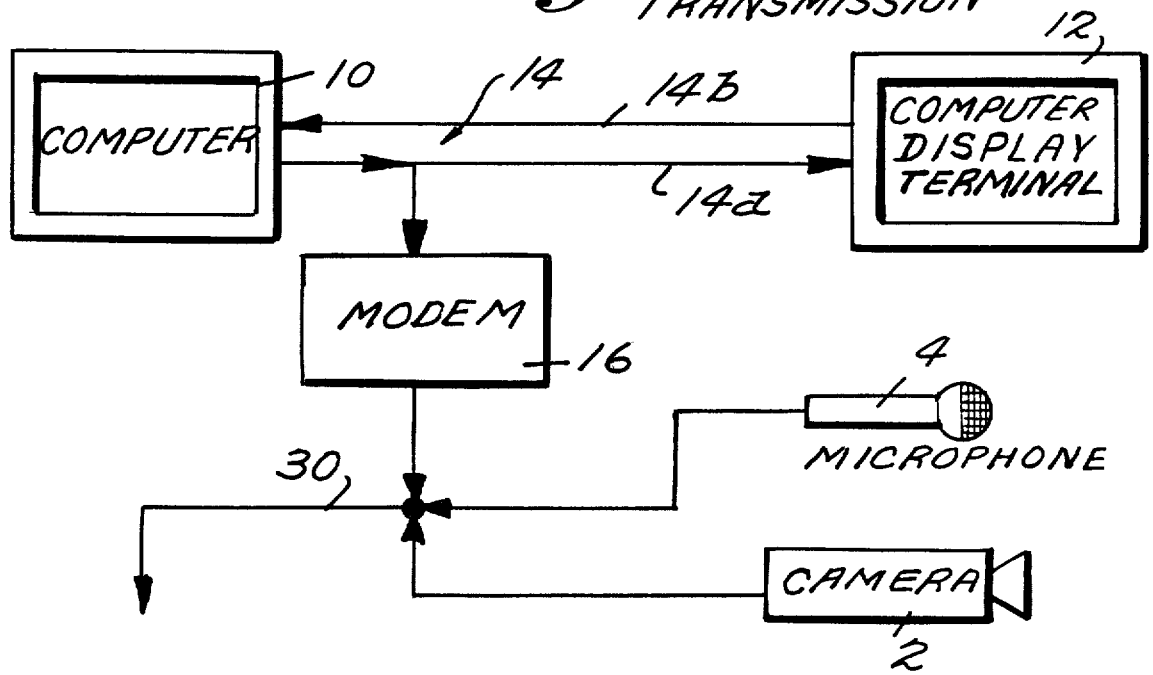
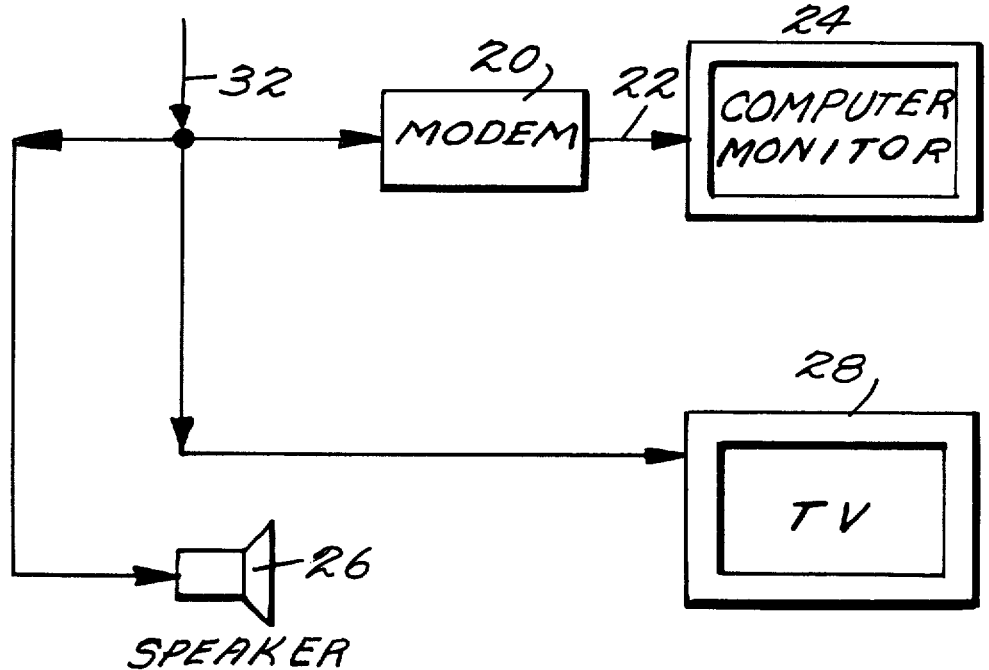

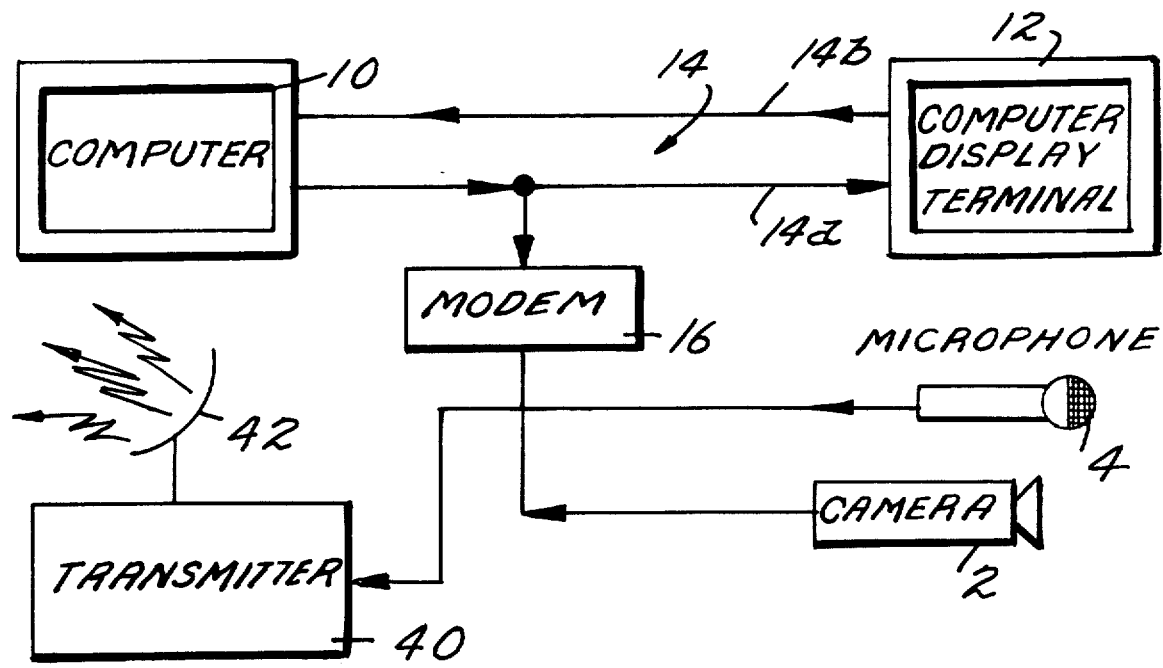
*Fig.3*A. TRANSMISSION
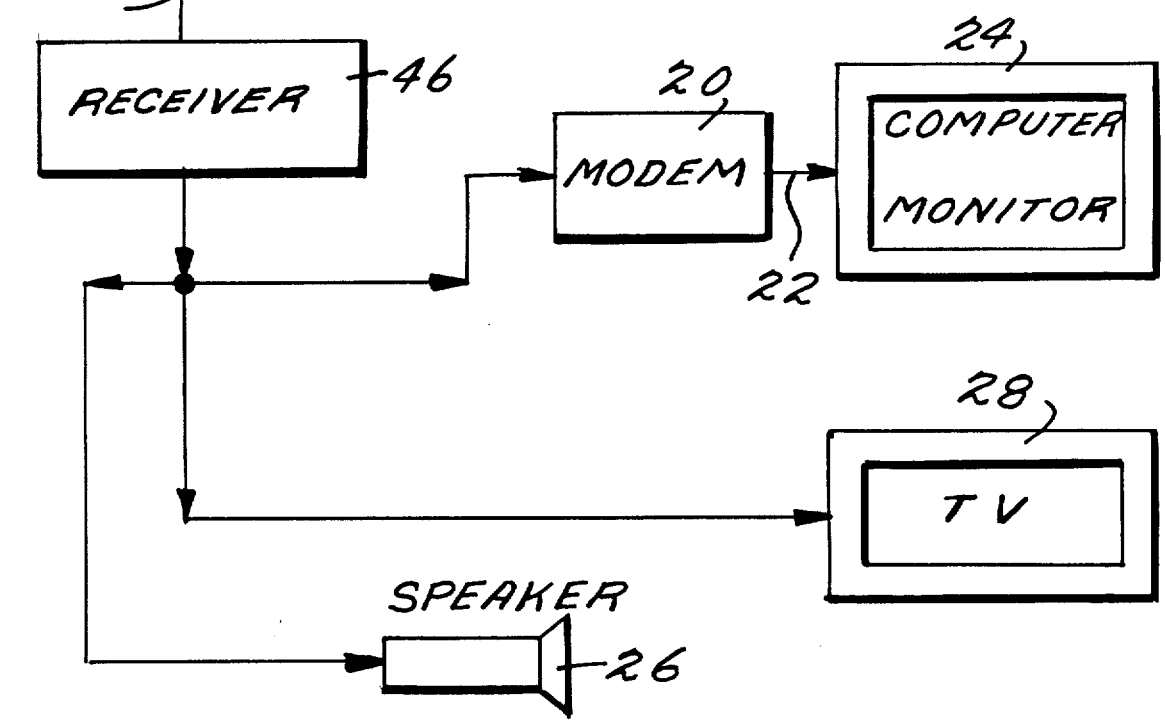
*Fig.3*B. RECEPTION

METHOD AND APPARATUS FOR TRANSMITTING/RECORDING COMPUTER-GENERATED DISPLAYS ON AN INFORMATION CHANNEL HAVING ONLY AUDIO BANDWIDTH

BACKGROUND OF THE INVENTION

This invention relates to the field of transmitting/recording computer-generated displays over low bandwidth channels, e.g. audio channels, perhaps simultaneously with other audio-visual information on additional channels. More particularly, this invention proposes to convert computer-generated codes necessary to generate the displays into, for example, audio tones; to transmit/record those audio tones over an audio bandwidth channel simultaneously with other audio/video signals; to reconvert the audio tones back into computer codes from which a computer display can be generated by a local computer monitor; and to simultaneously generate the computer display, the video display, and the audio synchronously as they were recorded/transmitted. With this invention, instructional sessions or teleconferences which include computer display or output can be broadcast or videotaped, complete with all the computer-displayed information.

At present, researchers are seeking a satisfactory method by which a high-resolution, computer-generated display may be successfully transmitted/recorded as part of a televised class or teleconference. Part of the problem is the higher resolution typically associated with computer displays. For example, a color monitor for a computer typically operates at a 20 MHz rate. This compares to the 3.58 MHz rate of normal NTSC television. Thus, to transmit/record the high-resolution images, it is necessary to have a transmission channel with sufficient bandwidth to resolve them, i.e. 20 z. One known solution is to provide a dedicated transmission channel having very large bandwidth; but this is impractical and requires highly specialized equipment.

A modem may be used to convert computer-generated information into a series of encoded audio tones which are then transmitted over an audio channel (telephone line) to a second modem which reconverts the audio tones into the computer-generated information. However, this use of a modem is limited in that no other audio or video information may be transmitted simultaneously with the computer-generated information. In addition, audio tones output from a modem have never been recorded on a recording medium simultaneously with other audio and video information. Such shortcomings are a serious problem when the desired communication involves the transmission of computer-generated images together with audio and/or video signals. The problem is evident in computer-training classes. Such classes usually involve aural and visual presentations including a high-resolution computer display monitor, as well as the normal chalkboard/viewgraph and verbal instruction. Where it is desired to transmit and/or record such a computer training class, it has been found impossible to transmit/record the high resolution, computer-generated image together with the normal video and audio signals. When an attempt is made to transmit/record a video signal which contains an image of the professor together with an image of the computer monitor, it has been found that the computer-generated image cannot be properly displayed due to the different operating bandwidths of the video camera and the computer monitor.

Since the number of computer training classes is rapidly increasing and since the availability of such classes can be improved by providing remote locations at which the classes may be observed, there is a need to provide an apparatus and method by which the computer-generated, high-resolution image may be transmitted/recorded simultaneously with the audio and video signals.

Those having skill in this field recognize that one attempt to address this problem is Videotex. Videotex is a method by which existing communications media such as telephone, cable, and television may be utilized to interchange computerized mass information. Such Videotex systems may transmit computer-generated images. However, such images are typically displayed on a television which does not have the same resolution as a computer monitor. In addition, the known Videotex systems such as Bildschirntext, Dow Jones News/Retrieval, Grassroots, Indax, NAPLPS, Prestel, Teleguide, Teletel, Viewtron, along with similar ASCII-based systems such as Compu Serve, Dialog, etc. are incapable of transmitting computer-generated images together wth standard video and/or audio signals.

Therefore, there remains a need for a method and apparatus of transmitting high-resolution, computer-generated images simultaneously with video and audio signals.

It is usual to communicate with general-purpose computers by means of a computer terminal. This terminal is designed to provide an operator with a convenient means of passing information to the computer, e.g., a keyboard or a "mouse"; and to provide the computer with a convenient means of passing information to the operator, e.g., a CRT display. In some cases the thermal is physically separate, as in "mainframe" or "timesharing" systems; in other cases the terminal is an integral part of the computer itself, as in "personal" or "laptop" computers. In either of the cases, the system operates almost exclusively with binary-valued electrical signals which are construed as binary pieces of information—binary digits (bits). The meaning of a particular sequence of bits is defined in the computer by hardware, by "firmware", and by software.

For systems in which the computer is physically distinct from the terminal, binary information passes between the two according to some electrical transmission standard—either as "parallel" information—in which eight bits are transmitted simultaneously on eight wires, or as "serial" information—in which one bit at a time is transmitted along a single wire. An example of a serial transmission standard is the so-called RS-232 protocol. (The present invention's description will refer to the RS-232 protocol as the usual standard for transmitting computer information serially. However, the present invention is not restricted to that particular serial standard.)

The computer terminal is a "convenient" means by which an operator can communicate with a computer, because it allows that operator to press the key labeled "a" rather than enter a particular bit sequence; and to receive a geometric figure "a" on the CRT rather than receive just the bit sequence. The fact that a computer sends out a bit sequence it considers the letter "a", and the terminal displays an "a" when it receives that bit sequence, means that the computer and terminal have been designed around the same definition of bit patterns or sequences. Definitions include, but are not limited to, the so-called ASCII and EBCDIC standards for interpreting bit patterns as alphanumeric characters, and Tektronix-4010 standards for interpreting bit patterns as graphics instructions. For graphics, when a terminal is designed to interpret graphics instructions, it will generate a line on the CRT when it receives the appropriate bit sequence. (In the explanation of the present invention below, the bit patterns or sequences are referred to generically as "computer codes or display codes". Since the present invention does not depend on a particular definition of the bit patterns, only that the computer and the associated terminal interpret the patterns the same, the phrase "computer code" is a sufficient descriptor.)

The computer can be connected to the terminal in several ways: directly, whereby wire(s) capable of carrying the digital computer codes ink the two; or indirectly, whereby the computer codes are carried over additional communication media. The most typical indirect means is through telephone lines. But digital computer codes cannot be transmitted by most telephone lines; consequently, the codes that emanate from the computer (or terminal) first must be converted to an analog form compatible with the transmission characteristics of the telephone line, and then must be reconverted into the original digital from for reception by the terminal (or computer). This conversion-reconversion is effected by a pair of devices called modems (MOdulators-DEModulators), one at the computer end to convert the digital computer codes into telephone compatible signals, the second at the terminal end to reconvert the telephone signals into the digital computer codes. These same devices work in the opposite direction when information is passed from the terminal to the computer.

The particular technique by which modems convert the digital computer signals for transmission over non-computer communication lines is transparent to the computer user and need not be elaborated upon. The converted signals need only be compatible with the transmission medium. For example, the need to be converted to audio tones for transmission over telephone lines. The computer/terminal connections on the modem need be compatible with the digital signal protocol used by the computer and terminal, e.g. RS-232. The definition of the 'computer codes' designed into both the computer and terminal is of no concern to the modem and the transmission of information. The modem converts/reconverts digital electrical signals without regard to their eventual interpretation by the computer/terminal.

It is with these computer-related elements that the present invention is concerned.

SUMMARY OF THE INVENTION

It is an object of the present invention to overcome the above-described shortcomings of known systems.

The present invention provides method and apparatus for transmitting a high-resolution, computer-generated image together with an audio and/or video signal. The apparatus includes an audio (and/or video) signal generating means adapted for receiving aural (and/or visual) input and convert it into electrical audio (and/or video) signals. A computer is provided for generating the high-resolution image. The computer outputs a series of display codes which may be ASCII codes or any other known kind of codes, on a standard RS 232 communications line. A first modem, of a known type is coupled to the output of the computer and receives the display codes which represent the computer-generated image. The modem converts these display codes into a series of audio tones at the audio bandwidth. Any standard modem can be used, because the modems are transparent to the system. These audio tones are then transmitted over a transmission medium having a first audio channel and a second audio channel (and/or a video channel). While the audio tones are being transmitted over the first audio channel, the audio (and/or video) signals may be transmitted over the second audio channel (and/or the video channel). Thus, the high-resolution, computer-generated image is transmitted simultaneously with an audio signal and/or a video signal.

Upon reception of the transmitted signals, the audio tones are reconverted at a second modem into standard RS 232 computer-legible display codes. These display codes are then provided to a computer monitor which interprets the codes and generates the display exactly as if it had been sent from the computer itself. At the same time, the received audio (and/or video) signals are provided to audio (and/or video) display means for providing aural (and/or visual) output.

There are several key elements to this scheme: first, just the display codes necessary to create the computer display—not the display itself—are transmitted/recorded; second, the display is internally generated by the receiving computer monitor. The audio/video signals may be output separately on a conventional television monitor.

In a particularly simple application of the present invention, the transmission means includes a stereo video tape recorder having left and right audio channels. The computer generates the coded image information which is sent to a first modem through a standard RS 232 line. The modem converts the image codes into audio tones which are then input into one of the audio channels of the video tape recorder. At the same time, audio input is provided from a microphone into the other audio channel of the stereo video tape recorder. In addition, a video camera may then provide video input to the video channel of the video tape recorder.

The video tape recorder thus records on a video tape the image bearing audio tones on the left channel, the microphone audio input on the right audio channel, and the video camera input on the video channel. This video tape may then be transported (transmitted) to a different location where it is played back on a second stereo video tape recorder. The image-bearing audio tones are played back on the left audio channel and are output directly to a second modem. This second modem reconverts the audio tones into standard RS 232 code. This code is then input into a computer display monitor which displays the high-resolution image generated by the computer. Meanwhile, the audio signal is played back on the video tape recorder right audio channel and the output signal is provided to a standard speaker. Also, the video signal is played back by the second video tape recorder and provided at a standard video display output such as a television screen.

This simple solution is particularly effective in that the entire system can be assembled from off-the-shelf components. The only modifications required may be some slight adjustments to the modems to insure that the transmit carrier frequency of the first modem is substantially equal to the receive carrier frequency of the second modem.

The above description refers to an "audio channel" as the means by which the computer display information is to be transmitted/recorded. This is not to suggest that the present invention limits its means of transmission/recording to audio. Rather, the present invention recognizes that any signal technique—digital or analog, single or multiplexed—is suitable for carrying the computer display information. Using an available audio channel is currently thought to be the most convenient way of practicing this invention.

Further, the above description of the stereo video tape recorder embodiment suggests that a television monitor and a computer-display-generating monitor are required for both video and computer outputs. The present invention recognizes that a single display monitor could be built which could carry out both functions, though not necessarily simultaneously. If a computer session were recorded—audio, video, and computer—a special monitor could be made to automatically switch between computer and video modes. In the video mode, this monitor would display the images recorded on the video channel; in the computer mode, this monitor would interpret the computer display codes and internally generate the computer display. Of course the special monitor would have to have a display bandwidth consistent with computer displays.

BRIEF DESCRIPTION OF THE DRAWINGS

These and other advantages according to the presently claimed invention may be readily understood from the following detailed description of the presently preferred exemplary embodiment when taken together with the drawings in which:

FIG. 2A is a block diagram of the recording apparatus for the transmission cable embodiment according to the present invention;

FIG. 2B is a block diagram of the receiving apparatus for the transmission cable embodiment according to the present invention;

FIG. 3A is a block diagram of the transmission apparatus for the broadcast embodiment according to the present invention; and FIG. 3B is a blocked diagram of the reception apparatus according to the broadcast embodiment according to the present invention.

DETAILED DESCRIPTION OF THE PRESENTLY PREFERRED EXEMPLARY EMBODIMENT

The fundamental idea according to the present invention is as follows. The conventional NTSC television signal does not have the bandwidth to record or transmit high-resolution images from a computer display, let alone simultaneously with a television picture and/or audio signal. The usual reasoning is that the computer monitor, refreshing its screen 60 times per second requires a signal bandwidth almost 5 times as great as television because of the five-fold greater resolution of a computer monitor. Since the NTSC bandwidth just accomodates regular television, it would seem impossible to include high-resolution, computer-generated images with the presently available technology. In fact, this reasoning is false. The present inventor has observed that a color computer monitor is driven by a host computer through a standard RS 232 asynchronous communications line. Therefore, as much information as appears on the computer monitor must pass through this RS 232 line. The speed of this communication line usually ranges between 300–9600 baud. Currently, computer codes at speeds of up to 2400 baud are converted by modems into audio tones and sent over regular telephone lines. These telephone lines necessarily have a signal bandwidth less than that of regular television audio. Consequently, if an extra audio channel could be provided, one could transmit the codes necessary to generate a computer-generated image over one audio channel while simultaneously transmitting an audio signal over the other audio channel.

On reception, the transmitted audio tones are then converted back into computer codes by a second modem. The output of the second modem is coupled to a computer monitor which then responds as if it were driven by the host computer itself. Of course, there is no interactive capability with such an arrangement. However, the information necessary to generate the complete computer-generated image may be recorded and/or transmitted at real time without loss of signal.

Figure 1A:
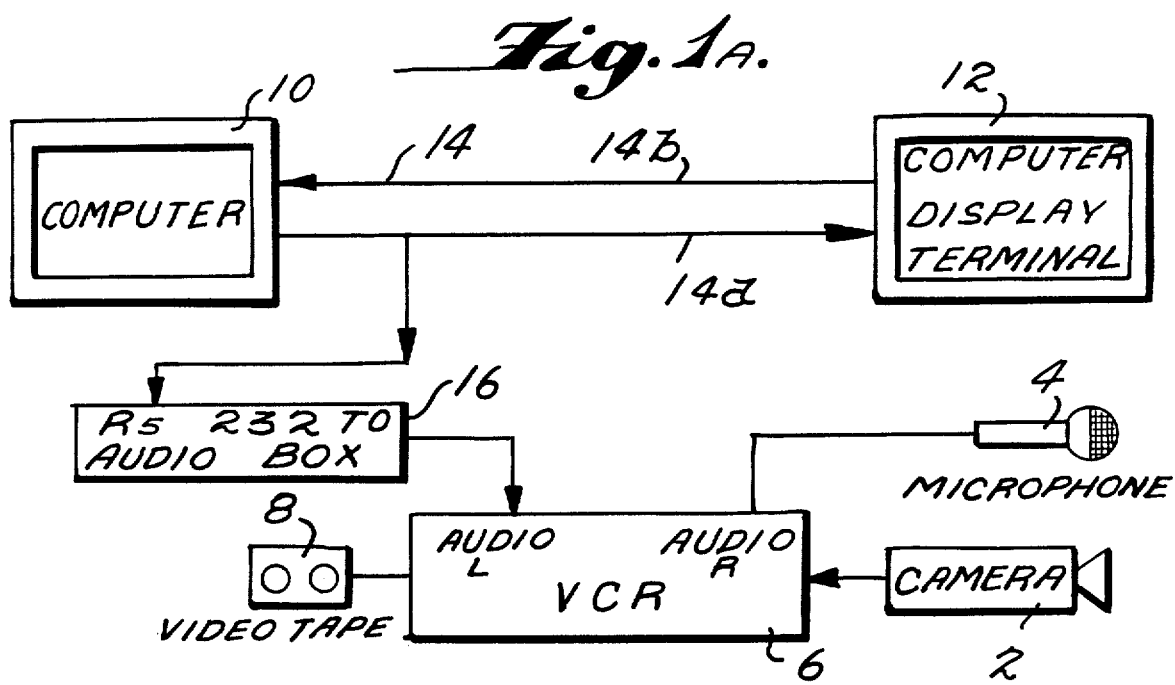
FIG. 1A is a block diagram depicting the recording apparatus for the video tape recorder embodiment according to the present invention.
Figure 1B:
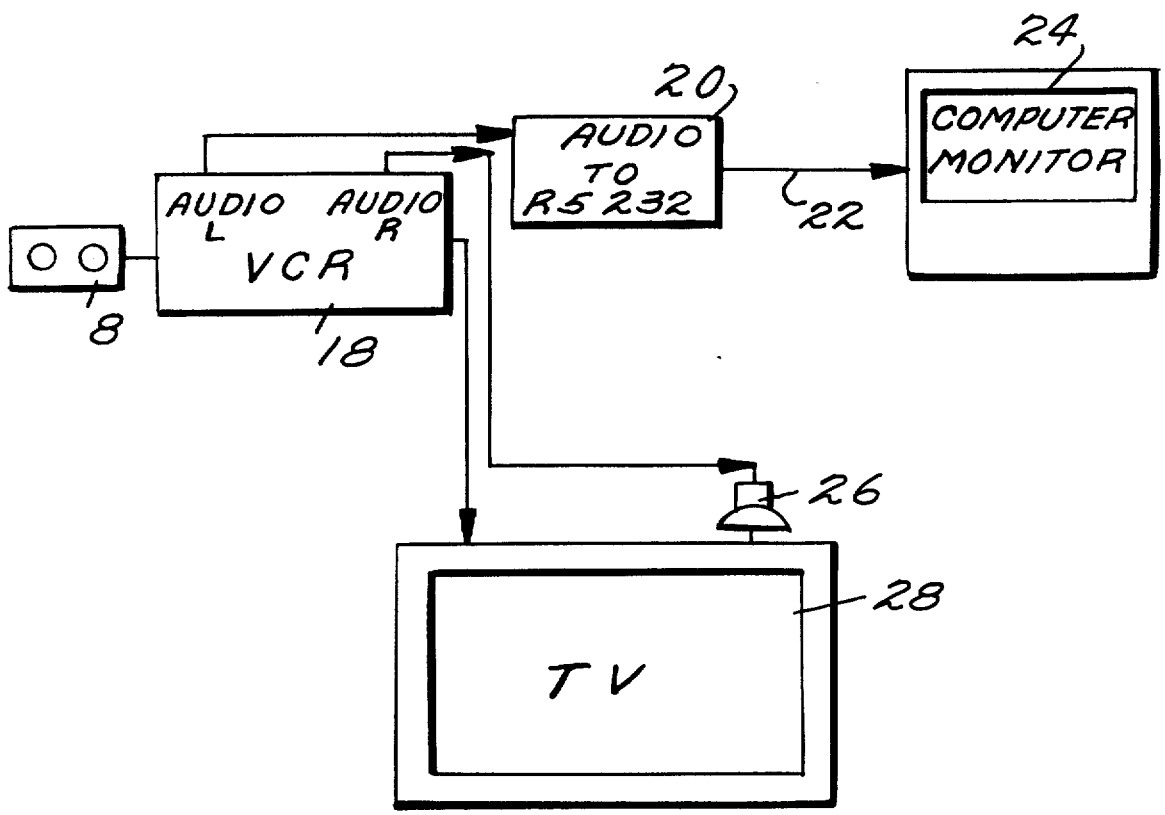
FIG. 1B is a block diagram of the playback apparatus for the video tape recorder embodiment according to the present invention.

FIGS. 1A and 1B depict a simple assembly of off-the-shelf components which may be used to practice the present invention. While FIGS. 1A and 1B depict a particularly simple and effective solution, it is to be understood that the teachings of this invention are not to be limited to the disclosed embodiment, but on the contrary, are to be interpreted as covering such equivalent solutions as would suggest themselves to persons of ordinary skill in this field. The apparatus according to FIGS. 1A and 1B are particularly useful in an instructional television environment or in a teleconferencing situation in which computer displays would contribute to the presentation. For example, a computer training class (including computer-generated, high-resolution images) may be video tape recorded for later use. Video camera 2 and microphone 4 are advantageously positioned to monitor the classroom activities and to convert visual and aural inputs into video and audio signals. The video signals from video camera 2 are input into the video channel of video tape recorder 6. Simultaneously, the audio signals provided from microphone 4 are input into the right audio channel of the stereo video tape recorder 6. Thus, while the professor is conducting class, video and audio images of his presentation are recorded on video tape 8 by video tape recorder 6.

As part of the professor's class, a "computer session" may be presented in which both the instructions to the computer and the computer's response and output are to be displayed/transmitted/recorded. Typically display terminal 12 is used to control computer 10 through communications line 14—a standard, full-duplex RS232 communications line. What is typed by the professor on terminal 12 is coded by that terminal and sent to computer 10 via communications line 14a. Computer 10 sends back to terminal 12 via communications line 14b not only an echo of what was typed on the terminal, but also any output codes generated by computer 10. Terminal 12 decodes what it receives over communications line 14b and from that information creates a display. The resolution and type of display is entirely determined by terminal 12 and the codes sent over the communications line. This structure and method of displaying input commands and computer output is well-known to persons of ordinary skill in this field.

Coupled to line 14a is a first modem 16. Modem 16 may be a standard off-the-shelf 300/1200/2400 baud modem. Such modems have a transmit carrier frequency, and a receive carrier frequency which is different than the transmission carrier frequency.

Modem 16 receives the same computer-generated codes from which computer terminal 12 constructs the image. Modem 16 converts these codes into audio tones which have an audio frequency bandwidth. These audio tones are then input into the left audio channel of video tape recorder 6. Thus, when the professor produces a display on computer terminal 12 for the class, video tape recorder 6 records (a) the visual image of the professor onto the video channel of video tape 8, (b) the audio input of the professor onto the right audio channel of video tape 8, and (c) the audio tones having the display-bearing information onto the left audio channel of video tape 8. This information includes not only image information generated by the computer, but also image information initiated by the professor on the terminal and echoed back to the terminal by the computer.

FIG. 1B depicts the playback apparatus for reproducing the information recorded on video tape 8. Video tape 8 is inserted into video tape recorder 18 and played back. On playback, the audio tones recorded on the left audio channel of video tape 8 are output through the left audio channel output port of video tape recorder 18. These audio tones are provided to a second modem 20 which receives these tones and converts them into the codes which were generated by computer 10. These codes are then provided over a standard RS 232 line 22 to computer monitor 24. Computer monitor 24 then reconstructs the computer-generated images from the codes provided by second modem 20. Thus, those observing the image displayed on computer monitor 24 will see the same image that was displayed on computer monitor 12. The image displayed on computer monitor 24 is an image containing all the information originally generated or echoed back by computer 10, and has the resolution of monitor 24—not the resolution of the recording/transmitting medium.

At the same time that the audio tones are being played back by video tape recorder 18, the audio signals and the video signals recorded on video tape 8 are also played back. The audio signals are played back from the right audio channel of video tape 8 and are provided through the right audio channel output port of video tape recorder 18. This output is routed through a standard communications line to a speaker 26 which outputs the aural information originally picked up by microphone 4. At the same time, the video image recorded on the video channel of video tape 8 is played back through the video channel of video tape recorder 18. The video signals are output through a standard video output line to a video output device such as television 28. Thus, a student observing computer monitor 24, television 28, and speaker 26 would observe the same class that was picked up by video camera 2, microphone 4, and displayed on computer monitor 12.

Thus, an instructional television class involving computer-generated images may be faithfully reproduced at a location remote in time and space from the original class. The image displayed at the remote class can, depending on the display monitor used, be the same high-resolution, computer-generated image as was presented in the original class.

Those having skill in this field will recognize that the apparatus of FIGS. 1A and 1B may be modified depending upon the uses to which this invention is to be put. For example, computer terminal 12 need not display the image since the image codes generated by computer 10 will be provided to modem 16 even if they are not displayed on monitor 12. Thus, a professor could prepare a class without having a display monitor present. The computer-generated images could still be displayed at a remote location through computer monitor 24.

As another modification, it may be desirable to exclude video camera 2 and television 28 from the system. For example, the professor may not desire to display visual information (other than the computer-generated information) to the class. In such a circumstance, video tape recorders 6 and 18 may be replaced with stereo audio tape recorders. Thus, the image-bearing audio tones may be recorded on the left channel of an audio tape while the audio signals from microphone 4 are recorded on the right channel of an audio tape. On playback, the audio tones would be provided to modem 20 for subsequent conversion into codes which are used to display the computer-generated information on monitor 24. At the same time, the audio signals from the right channel of the audio tape may be output to speaker 26. Such a configuration may be particularly useful in hands-on computer operator training.

Those having skill in this field will recognize that the receive carrier frequency of modem 20 must be the same as the transmit carrier frequency of modem 16. Thus, it is believed that some minor modification to modem 16 and/or 20 should be performed in order to effectuate this invention. However, it is felt that, as the teachings of this invention are dissemenated, modem manufacturers may provide off-the-shelf modem which have matched transmit-receive carrier frequencies.

FIGS. 2A and 2B depict another embodiment according to the present invention. The transmission apparatus of this alternative embodiment is depicted in FIG. 2A. In this embodiment, the image-bearing audio tone signals from modem 16, the audio signals from microphone 4, and the video signals from video camera 2 are all transmitted simultaneously over transmission cable 30. Such a cable could be, for example, a cable television line which may be routed between the classroom and the student's home. Transmission cable 30 should include, in parallel, two audio channels and a video channel. Known cable television transmission cables have such a capability.

FIG. 2B shows the reception apparatus according to the alternative embodiment. The image-bearing audio tone signals, the audio signals, and the video signals are received over transmission cable 32 which is coupled to transmission cable 30. As in the video tape recorder embodiment, the image-bearing audio tone signals are converted by modem 20 into coded signals which are provided over RS 232 line 22 to computer monitor 24. Computer monitor 24 thus displays the image generated at computer 10. At the same time, the audio signals are provided to speaker 26 and the video signals are provided to television 28.

In the above-described configuration, a live computer class may be transmitted to a student's home. The student thus observes the computer-generated display on his/her monitor 24 simultaneously with the video and audio signals displayed on his/her television 28 and speaker 26. In this fashion, computer training classes may be made available to locations remote from the class site. Such an apparatus would extensively enhance the availability of computer training to persons now unable to receive such training.

FIGS. 3A and 3B depict another alternative embodiment according to the present invention. This is the "broadcast" embodiment but should be thought of as emcompassing regular broadcast signals and other known methods of transmitting signals without electrical cables, such as microwave, etc. FIG. 3A shows the transmission apparatus and includes computer 10, computer display terminal 12, modem 16, microphone 4 and video camera 2, as in the heretofore-discussed embodiments. However, instead of storing the signals or transmitting them on an electrical cable, the signals are provided to a transmitter 40 which transmits these signals through antenna 42. Thus, transmitter 40 simultaneously receives the image-bearing audio tone signals from modem 16, the audio signals from microphone 4, and the video signals from video camera 2. These signals are transmitted simultaneously through antenna 42 over first and second audio channels and a video channel.

FIG. 3B depicts the reception apparatus according to this alternative embodiment. Antenna 44 picks up the first and second audio channels and the video channel from transmitting antenna 42 (or a repeater). Receiver 46 receives the output of antenna 44 and thus simultaneously provides the image-bearing audio tone signals, the audio signals, and the video signals. As in the previously-discussed embodiments, the image-bearing audio tone signals are provided to modem 20 which reconverts the audio tone signals into codes which are transmitted via RS 232 line 22 to computer monitor 24. Computer monitor 24 then regenerates and displays the image generated by computer 10. At the same time, the audio and video signals received at receiver 46 are provided to speaker 26 and television 28, respectively.

The embodiment according to FIGS. 3A and 3B may be particularly useful in transmitting computer training classes to locations inaccessible to cable television and/or other electrical cable connections. Thus, even persons in very remote locations may benefit from computer training classes with a simple adaptation of off-the-shelf equipment.

The present invention also provides methods for transmitting the computer-generated image. These methods are readily ascertainable from the operation of the above-described apparatus. Those of ordinary skill in this field will be readily enabled to practice the methods according to the present invention from the description provided heretofore.

Thus, what has been described is a simple yet effective solution for transmitting and/or storing high-resolution, computer-generated images simultaneously with audio and/or video signals. The teachings of this invention will provide great stimulation to further enhance the availability and effectiveness of computer training classes.

While the invention has been described in connection with what is presently considered to be the most practical and preferred embodiments, it is to be understood that the invention is not to be limited to the disclosed embodiments. On the contrary, the teachings of the present invention are intended to cover various modifications and equivalent arrangements included within the spirit and scope of the appended claims. The scope of the attached claims is to be accorded the broadest interpretation so as to encompass all such modifications and equivalent structures and methods.

I claim:

1. Apparatus for transmitting a computer-generated image together with an audio signal, comprising:
    audio signal generating means adapted for receiving an aural input and converting said aural input into electrical audio signals indicative thereof;
    computer means for generating first display codes from which said computer-generated image may be derived;
    first conversion means for receiving said first display codes and converting each said display code into an electrical audio tone signals indicative of said each first display codes; and
    transmission means, coupled to said audio signal generating means and to said first conversion means and having first and second channels of an audio bandwidth, for simultaneously transmitting said audio signals on said first channel and said audio tone signals on said second channel.

2. Apparatus according to claim 1 further including:
    reception means for receiving said audio signals and said audio tone signals;
    second conversion means, coupled to said reception means, for converting the received audio tone signals into second codes;
    display means for receiving said second codes and generating therefrom said computer-generated image, and for displaying said image; and
    audio output means, coupled to said reception means, for receiving said audio signals and generating an aural output therefrom.

3. Apparatus according to claim 1 further including video signal generating means adapted for receiving a visual input and converting it into video signals, and wherein said transmission means is coupled to said video signal generating means and includes a video bandwidth channel for transmitting said video signals simultaneously with said audio signals and said audio tone signals.

4. Apparatus according to claim 3 further including:
    reception means for receiving said video signals, said audio signals, and said audio tone signals;
    second conversion means, coupled to said reception means, for receiving said audio tone signals and converting them into second codes;
    display means for receiving said second codes and generating therefrom said computergenerated image, and for displaying said image;
    audio output means, coupled to said reception means, for receiving said audio signals and generating an aural output therefrom; and
    video output means, coupled to said reception means, for receiving said video signals and generating a video display corresponding to said visual input.

5. Apparatus according to claim 4 wherein said reception means includes video playback means having first and second audio bandwidth channels and a video bandwidth channel, and wherein said video output means includes a CRT.

6. Apparatus according to claim 4 wherein said transmission means includes:
    video recording means for recording said video signals;

audio recording means for recording said audio signals and said audio tone signals simultaneously with the recording of the video signals; and storage means for storing the simultaneously recorded video, audio, and audio tone signals.

7. Apparatus according to claim 4 wherein said transmission means includes:

a video recorder having a two channel audio recording capability having (a) means for recording said video signals, and (b) means for recording said audio signals and said audio tone signals as said two channels; and video storage means having a video bandwidth channel for storing the video signals, and first and second audio bandwidth channels for sorting said audio signals and said audio tone signals, respectively.

8. Apparatus according to claim 4 wherein said transmission means includes a first electrical cable coupled to said first conversion means, said audio signal generating means, and said video signal generating means.

9. Apparatus according to claim 8 wherein said reception means includes a second electrical cable coupled between (a) said first transmission cable and (b) said second conversion means, said audio output means, and said display means.

10. Apparatus according to claim 4 wherein said transmission means includes broadcast transmission means for simultaneously broadcasting said video signals over a video bandwidth channel, and said audio signals and said audio tone signals over first and second audio bandwidth channels, respectively.

11. Apparatus according to claim 10 wherein said reception means includes broadcast receiver means for receiving the broadcast signals and providing said audio tone signals to said second conversion means, said audio signals to said audio output means, and said video signals to said display means.

12. Apparatus for transmitting a computergenerated image, comprising:

computer means for generating first display codes containing information from which said image may be derived;

first modem means for receiving said first display codes and coverting said first display codes into audio tones indicative thereof;

a recording medium having first and second channels of an audio bandwidth;

recording means for recording said audio tones on said recording medium first audio channel.

13. Apparatus according to claim 12 further including:

playback means for receiving said recording medium and playing back said audio tones recorded on said recording medium first audio channel;

second modem means for receiving the played back audio tones and converting them into second codes; and display means for receiving said second codes and generating and displaying the image generated by said computer means.

14. Apparatus according to claim 13 further including audio signal generating means for receiving aural input and converting it into audio signals, and wherein said recording means is coupled to said audio signal generating means and records said audio signals on said recording medium second audio channel.

15. Apparatus according to claim 14 wherein said playback means plays back said audio signals recorded on said recording medium second audio channel, and further including audio output means, coupled to said playback means, for receiving said audio signals and generating an aural output therefrom.

16. Apparatus according to claim 15 wherein said recording medium includes a video bandwidth channel, and wherein said recording means records video signals on said recording means video channel, and further including video input means for receiving visual input and converting it to video signals.

17. Apparatus according to claim 16 wherein said playback means plays back said video signals recorded on said recording medium video channel, and further including video output means, coupled to said playback means, for receiving said video signals and generating a video image therefrom.

18. Apparatus according to claim 17 wherein said recording means and said playback means each comprise a video tape recorder, and wherein said recording medium comprises a video tape.

19. Apparatus according to claim 17 wherein said recording medium comprises a video disc recorder, said playback means comprises a video disc player, and said storage medium includes a video disc.

20. An apparatus for transmitting computer-generated image signals comprising:

a first modem connected to receive said computer-generated signals and convert them into audio tones;

a video recorder having at least one audio bandwidth channel, for recording said audio tones through said audio channel; and a video storage medium, coupled to said video recorder, for storing the recorded audio tones.

21. Apparatus according to claim 20 further including:

video playback means for receiving said storage medium and playing back the audio tones stored thereon; and a second modem, coupled to said playback means, for receiving said audio tones and reconverting them into said computer-generated image signals.

22. Apparatus according to claim 21 wherein said video recorder and said video playback means each comprise a video tape recorder, and wherein said video storage medium comprises a video tape.

23. A method of transmitting computer-generated image signals, comprising the steps of:

generating a signal which is intended to be in synchronism with said computer-generated image signals;

converting said computer-generated image signals into audio tones indicative of said computer generated image; and simultaneously recording said audio tone using an audio bandwidth channel of a video recorder and said signal using another channel of said video recorder, onto a video storage medium.

24. A method according to claim 23 further including the steps of:

playing back said storage medium; and reconverting the played-back audio tones into said computer-generated image signals and converting said signal in synchronism therewith.

25. A method of transmitting a computer-generated image comprising the steps of:

generating, with a computer, first display codes containing information from which said image may be derived;

converting each of said first display codes into audio bandwidth tones indicative thereof; and recording said audio tones on an audio channel of a storage medium.

26. A method according to claim 25 further including the steps of:

playing back the audio tones stored on said storage medium audio channel;

reconverting the played-back audio tones into second codes; and generating said computer-generated image from said second codes.

27. A method according to claim 26 further including the steps of:

receiving aural input and converting it into audio signals; and recording said audio signals on a second audio bandwidth channel of said storage medium.

28. A method according to claim 27 further including the steps of:

playing back the audio signals recorded on the second audio channel of the storage medium; and reconverting the played back audio signals into aural output.

29. A method according to claim 28 further including the steps of:

receiving visual input and converting it to video signals; and recording said video signals on a video bandwidth channel of said storage medium.

30. A method according to claim 29 further including the steps of:

playing back the video signals recorded on said storage medium video channel; and receiving the played back video signals and generating a video image therefrom.

31. A method for transmitting a computer-generated image together with an audio signal, comprising the steps of:

receiving aural input and converting it into electrical audio signals;

generating, with a computer, first codes from which said image may be derived;

converting said first codes into electrical audio tone signals; and simultaneously transmitting said audio signals and said audio tone signals on first and second audio bandwidth channels, respectively.

32. A method according to claim 31 further including the steps of:

receiving the transmitted audio signals and audio tone signals;

converting the received audio tone signals into second codes;

generating said image from said second codes, and displaying said image; and receiving said audio signals and generating an aural output therefrom.

33. A method according to claim 31 further including the steps of:

receiving visual input and converting it into video signals; and transmitting said video signals simultaneously with said audio signals and said audio tone signals.

34. A method according to claim 33 further including the steps of:

receiving said video signals, said audio signals, and said audio tone signals;

converting said audio tone signals into second codes;

generating said image from said second codes, and displaying said image;

generating an aural output from the received audio signals; and generating a video display from the received video signals.

35. A method according to claim 34 wherein said transmitting step includes the steps of:

recording said video signals on a storage medium having first and second audio bandwidth channels and a video bandwidth channel; and recording said audio signals on said storage medium first audio channel simultaneously with the recording of said audio tone signals on said storage medium second audio channel.

36. A method according to claim 34 wherein said transmitting step includes the step of simultaneously recording, on a video storage medium having a video bandwidth channel and first and second audio bandwidth channels, (a) said video signals on said storage medium video channel, (b) said audio signals on said storage medium first audio channel, and said audio tone signals on said storage medium second audio channel.

37. A method according to claim 34 wherein said transmitting step includes the step of simultaneously transmitting said video signals, said audio signals, and said audio tone signals over a first electrical cable.

38. A method according to claim 37 wherein said receiving step includes the step of receiving the transmitted video signals, audio signals, and audio tone signals through a second electrical cable coupled to said first electrical cable.

39. A method according to claim 34 wherein said transmitting step includes the step of simultaneously broadcasting said video signals, said audio signals, and said audio tone signals.

40. A method according to claim 39 wherein said receiving step includes the step of receiving the broadcast video signals, audio signals, and audio tone signals.

41. An apparatus for recording an informational session in synchronism with images on a computer display, comprising:

means for receiving said informational session, and for encoding said informational session into a form which can be recorded on a recording medium;

a computer for performing processing operations of a type related to said information session and for creating first display codes indicative of characters to be displayed on the screen of said computer;

a modem, coupled to said computer to receive said first display codes to produce audio signals indicative of said first display codes; and multi-channel recording means, coupled to simultaneously receive said encoded informational session information on one channel thereof and said encoded display codes on another channel thereof, for recording said information on respective channels on the recording medium.

42. An apparatus as in claim 41 wherein said informational session includes a video portion and an audio portion, and said multi channel recording means is a stereo VCR which records said video portion on said video channel, records said audio portion on one of said audio channels, and records said audio signals indicative of display codes on another of said audio channels.

43. An apparatus as in claim 42 further comprising a second stereo VCR, for playing back said recorded recording medium to simulate said informational session in synchronism with said computer display.

* * * * *